United States Patent [19]

Seto et al.

[11] Patent Number: 4,505,569

[45] Date of Patent: Mar. 19, 1985

[54] PROJECTION APPARATUS WHICH COMPENSATES FOR THE SPECTRAL SENSITIVITY OF AN IMAGE RECEIVING MEMBER

[75] Inventors: Susumu Seto, Odawara; Akihiko Toriumi, Kaisei, both of Japan

[73] Assignee: Canon Kabushiki Kaisha, Tokyo, Japan

[21] Appl. No.: 606,843

[22] Filed: May 1, 1984

Related U.S. Application Data

[63] Continuation of Ser. No. 405,862, Aug. 6, 1982, abandoned.

[30] Foreign Application Priority Data

Aug. 8, 1981 [JP] Japan ................................ 56-124210

[51] Int. Cl.$^3$ ............................................. G03G 15/00
[52] U.S. Cl. ................................... 355/3 R; 355/14 R; 355/35; 353/84; 350/409; 350/438; 501/11; 501/78
[58] Field of Search .................... 355/3 R, 14 R, 35; 353/25, 26 A, 28, 20, 84; 350/409, 431, 438, 439; 501/11, 73, 76, 78, 79, 438, 439

[56] References Cited

U.S. PATENT DOCUMENTS

| 4,244,646 | 1/1981 | Bayer et al. ...................... 355/3 R |
| 4,288,250 | 9/1981 | Yamashita ............................ 501/78 |
| 4,297,142 | 10/1981 | Ritze ............................... 501/78 X |
| 4,305,757 | 12/1981 | Yamashita ............................ 501/78 |
| 4,348,484 | 9/1982 | Joormann et al. ............... 350/409 X |
| 4,377,628 | 3/1983 | Ishioka et al. ................. 335/3 R X |
| 4,382,672 | 5/1983 | Boykin ........................... 355/3 R X |
| 4,396,720 | 8/1983 | Beall et al. ..................... 501/78 X |

Primary Examiner—A. C. Prescott
Attorney, Agent, or Firm—Fitzpatrick, Cella, Harper & Scinto

[57] ABSTRACT

A projection apparatus includes an optical system for forming an image of an object illuminated by an illumination source on a photosensitive member. In the projection apparatus according to the invention, at least one lens in the lens system disposed in the optical path extending from the illumination source to the photosensitive member is such lens which possesses a property of spectral transmission factor to compensate the spectral sensitivity of the photosensitive member.

12 Claims, 9 Drawing Figures

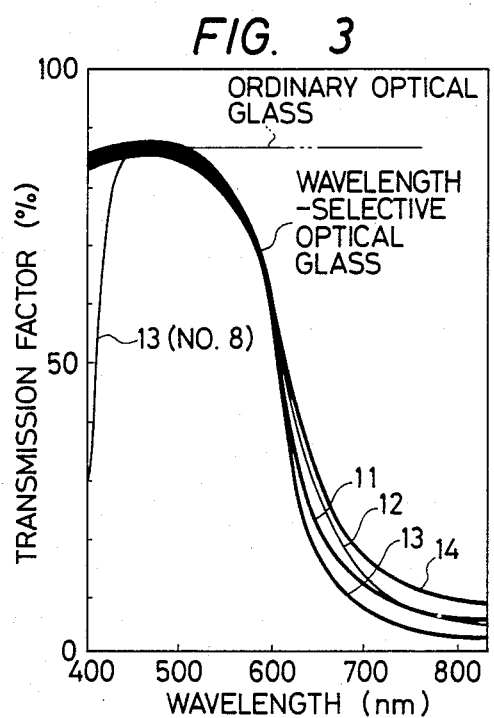
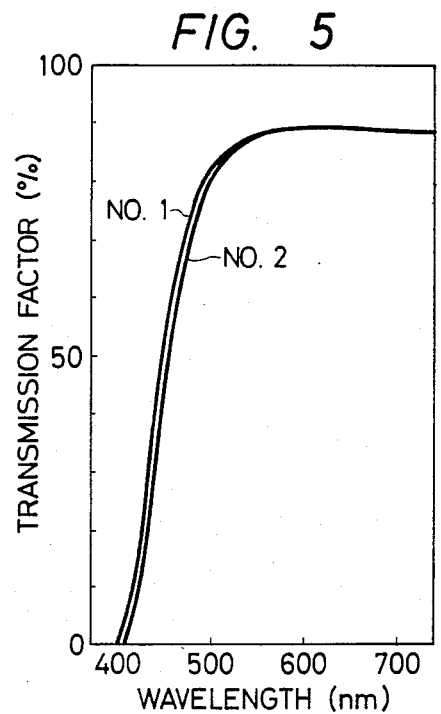
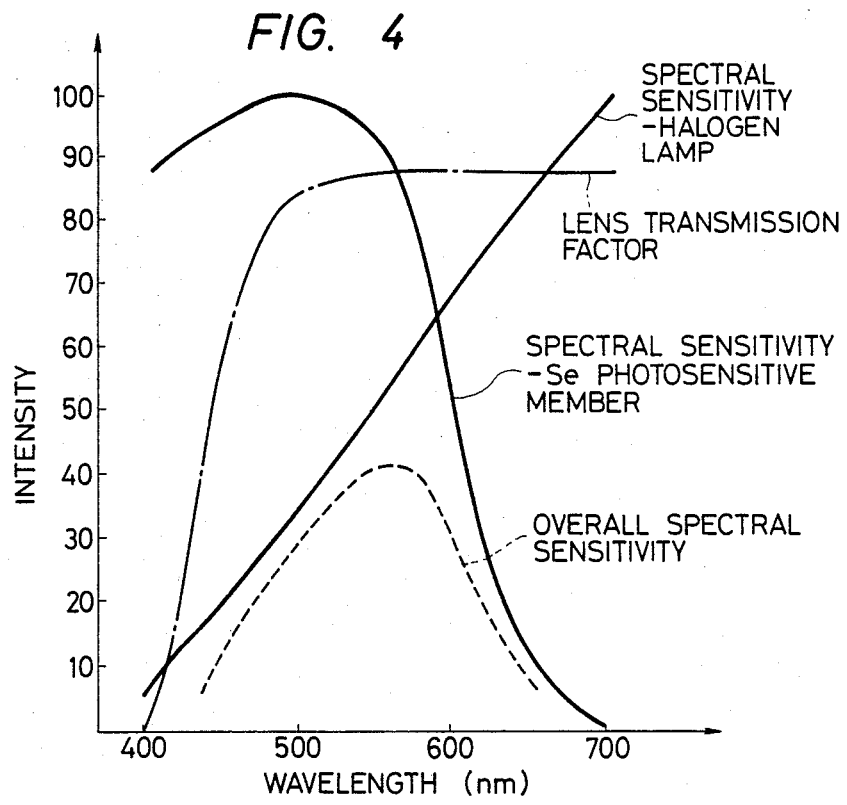

PROJECTION APPARATUS WHICH COMPENSATES FOR THE SPECTRAL SENSITIVITY OF AN IMAGE RECEIVING MEMBER

This application is a continuation of application Ser. No. 405,862 filed Aug. 6, 1982, now abandoned.

BACKGROUND OF THE INVENTION

1. Field of the Invention

The present invention relates to a projection apparatus of the type which includes an optical system for forming, on a photosensitive member, an image of an object illuminated by an illumination source wherein at least one lens in the lens system disposed in the optical path extending from the illumination source to the photosensitive member possesses a property of spectral transmission factor to compensate for the spectral sensitivity of the photosensitive member.

The term "lens" as used herein means a pure lens only and does not include those lenses which have a multi-layer interference coating or the like applied thereon. The term "photosensitive member" should be understood to include a conventional photosensitive drum or sheet, various solid state image sensors such as CCD and image pickup tubes such as a vidicon.

The projection apparatus having the lens particularly mentioned above has many applications. For example, it may be used for a copying machine, facsimile equipment, a television camera etc. In this specification, the present invention will be described in detail in connection with a copying machine as one possible application for the projection apparatus.

2. Description of the Prior Art

In general, the photosensitive member used in a copying machine has a spectral sensitivity different from the spectral sensitivity of the human eye (relative visibility, relative luminosity or relative luminous efficiency). The composite spectral sensitivity resulting from the combination of the photosensitive member and the illumination source is also different from the relative visibility. Therefore, the copies obtained from the copying machine have different contrast from that of the original.

By way of example, let us consider the combination of a halogen lamp as the illumination source and a CdS member as the photosensitive member. A halogen lamp is generally used at a filament temperature of about 3000° K. At this working temperature, the maximum value of its emission energy is in the infrared region of 800 to 900 nm and decreases gradually and constantly toward the shorter wavelength side. The spectral sensitivity of the CdS photosensitive member is high in the region near the infrared region. Consequently, the amount of exposure in the region of red to infrared is excessively large as compared with that in other regions, namely blue, green etc. This brings about the problem that characters and patterns written in red on the original are copied very thinly. In the worst case, they can not be copied at all.

The same problem also arises when a combination of an Se photosensitive member and an illumination source whose emission energy increases in the short wavelength region is used. In this case, in contrast with the above case, characters and patterns written in blue on the original are too thinly copied.

Similar unfavourable phenomena are observed with the combination of an Se photosensitive member and a halogen lamp and with the combination of a CdS photosensitive member and an illuminant whose emission energy becomes high in the short wavelength region.

This problem has not yet been solved although it is desirable to obtain a copy which has the same intensity distribution as that of the original. Obviously, the problem may be solved by compensating for the difference between the relative visibility and the spectral sensitivity mentioned above (such spectral sensitivity will also be referred to, hereinafter, as color sensitivity).

Two methods have already been proposed and used to solve the above problem. One of the known methods is to use a planar color filter. The other method is to use a multi-layer interference film which is disclosed, for example, in Japanese Patent Application Laid-Open No. 60142/1977 and Japanese Utility Model Application Laid-Open No. 99331/1977. These methods have been proposed to attenuate the light in a selected wavelength region thereby preventing over-exposure at the wavelength region. For example, in the case of the above-mentioned combination of a CdS photosensitive member and a halogen lamp, the light in the region near the infrared region is selectively decreased.

However, these prior art methods have some drawbacks.

The use of a planar color filter involves the problem of aberration in a parallel plane. As the color filter is added to the apparatus, the manufacturing cost of the apparatus increases. Further, a larger loss of light is caused by the surface reflection of the filter.

The second mentioned method employing a multi-layer interference film also leads to the problem of increased cost. Usually such interference film comprises many layers which are formed employing a very expensive technique such as vapour deposition. The spectral characteristics of the multi-layer interference film is not constant but variable depending on various factors of the optical system, in particular, depending on the incident angle of light. Further, the performance thereof is easily affected by heat and moisture and the film lacks durability. These are important drawbacks of the multi-layer interference film.

On the other hand, thermal ray absorbing filters are known in the art which attenuate the light in the near infrared region. Recently it has been proposed to use such filter as a condenser lens in a slide projector. However, it is by no means relevant to the subject of the present invention. The objective for which the thermal ray absorbing filter is used in a slide projector, is solely to prevent the elevation of temperature in the projector. It can never suggest any features of the present invention. According to the invention, the selection of wavelength is made from a broad range of wavelength regions after considering the spectral sensitivity of the photosensitive member being used. The prior art relates to the use of a thermal ray absorbing filter as a mere condenser for use in a slide projector. It has never been used as an image-forming lens which is required to have certain determined optical performance.

SUMMARY OF THE INVENTION

Accordingly it is a first object of the invention to provide a projection apparatus which has a lens capable of compensating for the spectral sensitivity of the photosensitive member used in the apparatus.

It is a second object of the invention to provide a wavelength selective lens system which has high refractive index and high to low dispersion favourable for optical design to correct chromatic aberration etc. and which has a determined spectral transmission factor.

It is a third object of the invention to provide a novel optical glass which has very good resistibility against devitrification, high refractive index, high to low dispersion and a determined spectral transmission factor.

Other and further objects, features and advantages of the invention will appear more fully from the following description taken in connection with the accompanying drawings.

BRIEF DESCRIPTION OF THE DRAWINGS

FIG. 3 is a graph showing the spectral transmission factor of a wavelength selective optical glass suitable for a CdS photosensitive member according to the invention and that of the ordinary optical glass for comparison;

FIG. 4 is a graph showing the spectral sensitivity of the illuminant, the spectral sensitivity of a Se photosensitive member and the spectral transmission factor of the lens system;

FIG. 5 is a graph showing the spectral transmission factor of a wavelength selective optical glass suitable for a Se photosensitive member according to the invention;

DESCRIPTION OF PREFERRED EMBODIMENTS

Figure 1:
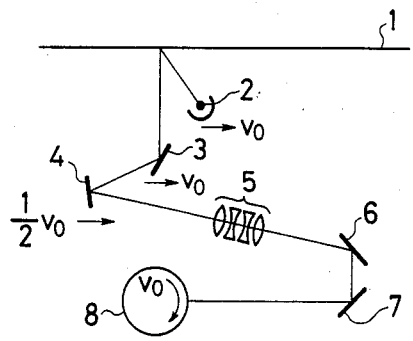
FIG. 1 is a schematic view of a copying machine in which the present invention is embodied.

FIG. 1 shows a copying machine in which the present invention is embodied.

1 is an original which is slitwise illuminated by an illuminant 2. In parallel with the original surface 1, scanning mirrors 3 and 4 move at the velocity ratio of 2:1 to scan the illuminated original surface. Through the scanning mirrors 3 and 4, the light reflected from the original 1 enters a stationary image-forming lens 5. An image of the original 1 formed by the image-forming lens 5 is projected slitwise on a photosensitive member 8 through stationary mirrors 6 and 7. The photosensitive member 8 is rotating in the direction of the arrow.

In this embodiment, the image-forming lens 5 is made of a wavelength selective optical glass according to the invention.

Figure 2:
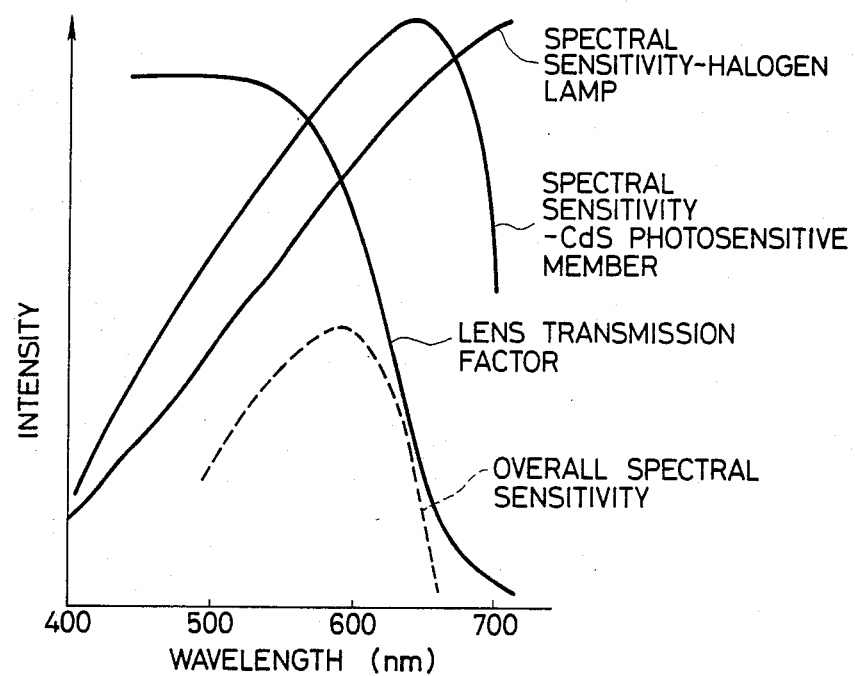
FIG. 2 is a graph showing the spectral sensitivity of a halogen lamp illuminant, the spectral sensitivity of a CdS photosensitive member and the spectral transmission factor of the lens system.

Shown in FIG. 2 are characteristic curves showing the spectral sensitivity of an illuminant, the spectral sensitivity of a photosensitive member and the transmission factor of the image-forming lens. The illuminant is a halogen lamp and the photosensitive member is part of a CdS system. As a result of these three characteristics there is obtained an overall spectral sensitivity curve, as indicated by the broken line, which has a close resemblance to the relative luminosity curve. In other words, the lens system is so designed as to have a spectral transmission factor which renders the overall spectral sensitivity approximate to the relative luminosity or relative luminous efficiency.

As seen from FIG. 2, the lens used for the combination of a CdS photosensitive member and a halogen lamp has a high spectral transmission factor in the wavelength region from 400 to 600 nm. However, the spectral transmission factor sharply drops in the wavelength region of 600 to 800 nm.

FIG. 3 shows the spectral transmission factor of a wavelength selective optical glass according to the invention which is suitable for use together with a CdS photosensitive member. For the sake of comparison, the spectral transmission factor of an ordinary optical glass is also shown in FIG. 3.

As seen from FIG. 3, the wavelength selective glass suitable for a CdS photosensitive member has a particularly determined transmission factor curve according to the invention. The transmission factor of the optical glass is high in the area of necessary wavelength regions and low in the area from red to infrared wavelength regions. Hereinafter, some concrete examples of the wavelength selective optical glass suitable for a CdS photosensitive member will be described.

This optical glass is a novel phosphate optical glass containing CuO. Its refractive index is in the range of 1.57 to 1.85 (nd) and its Abbe number is in the range of 57 to 25 ($\nu$d). The optical glass absorbs rays of light in the wavelength region of 600 to 800 nm and exhibits good resistance against devitrification.

It has been known that phosphate glass containing CuO acquires the ability to absorb infrared rays around 800–900 nm when the glass is melted in an oxidation atmosphere and processed to form stable $Cu^{++}$ ions in the glass. In order to make use of this particular property of CuO containing phosphate glass, attempts have been made to use the glass as a filter glass while further improving the sharpness of the effect to absorb rays of light in the wavelength region of 600 to 800 nm. Until now there have been proposed various $P_2O_5$-BaO-CuO system glasses useful as filter glass. But, these known CuO containing phosphate glasses are all unsuitable for use as optical glass, particularly for the purpose of the present invention. They are low refractive index and low dispersion glasses. If BaO, PbO, SrO, ZnO, etc. are added to the glass to render it high refractive and high or low dispersive, the glass obtained has the disadvantage that it is very devitrifiable. For these reasons, glasses of this type obtainable until now have been limited to those low refractive index and low dispersion glasses of refractive index (nd) < about 1.57 and Abbe number ($\nu$d) > about 60.

The present invention has overcome the above drawbacks of CuO containing phosphate glasses of the prior art. According to the invention there are provided novel CuO containing phosphate glasses which have a broader range of optical constants, a desirable light absorbing ability and a good resistance against devitrification. The refractive index (nd) of the glass according to the invention is in the range of from 1.57 to 1.85 and the Abbe number ($\nu$d) is in the range of from 57 to 25. It exhibits the light absorbing ability sharply at 600 to 800 nm which meets the above purpose of the invention.

The present invention is based on the finding that the vitrification range of $P_2O_5$-(PbO+BaO+SrO+ZnO)-CuO glass can be broadened to diminish the tendency to devitrification while maintaining the desired properties of high refractive index, high to low dispersion and selective light absorption, by adding a particularly determined amount of $Sb_2O_3$ to the glass.

The glass according to the invention contains 0.01–3 wt.% of CuO added to 100 parts by weight of a basic glass comprising:
$P_2O_5$ 28–68 (wt.%)
$Sb_2O_3$ 1–45

PbO 0–65
BaO 0–45
SrO 0–30
ZnO 0–40, wherein PbO+BaO+SrO+ZnO is 5–65 wt.%;
MgO 0–20
CaO 0–20
$Li_2O$ 0–10
$Na_2O$ 0–25
$K_2O$ 0–25, wherein $Li_2O+Na_2O+K_2O$ is 0–30 wt.%;
$Al_2O_3$ 0–17
$B_2O_3$ 0–20
$SiO_2$ 0–7
$TiO_2$ 0–10
$Nb_2O_5$ 0–25, wherein the CuO containing glass composition has the optical constants of refractive index (nd) ranging from 1.57 to 1.85 and an Abbe number ($\nu$d) ranging from 57 to 25.

The above specified ingredients and contents have the following meanings:

The ingredients of the basic glass are given as percentage by weight unless otherwise stated.

$P_2O_5$ is the main network-former of the optical glass according to the invention. If the content of $P_2O_5$ is less than 28%, the glass has an increased tendency to devitrification. Use of $P_2O_5$ more than 68% renders it difficult to maintain the desired optical constants of the optical glass.

$Sb_2O_3$ is one of the most important ingredients of the optical glass according to the invention. It prevents evaporation of $P_2O_5$ during the time the glass mass is in a molten state, broadens the vitrification range of the glass and accelerates the homogenization of the glass. Furthermore, the addition of $Sb_2O_3$ renders the glass highly refractive and highly dispersive while maintaining the excellent ability to absorb the rays of light in the desired wavelength region. To attain the effects, $Sb_2O_3$ should be added in an amount greater than 1%. However, use of more than 45% of $Sb_2O_3$ has an adverse effect to which renders the glass more devitrifiable.

PbO, BaO, SrO and ZnO are optional components. Each of these ingredients increases the refractive index of the glass. The Abbe number of the glass can be controlled by suitably controlling the content of these ingredients. Use of more than 65% of PbO has the adverse effect of reducing the resistibility against devitrification, abrasion etc. Addition of more than 45% of BaO, more than 30% of SrO and more than 45% of ZnO should be avoided, or else the glass obtained is less resistive against devitrification. If the total content of this group of ingredients is less than 5%, it is impossible to obtain a glass having the desired optical constants. When the total content of this group is more than 65%, it renders the glass more devitrifiable.

MgO and CaO are optional ingredients which serve to control the optical constants of the glass and also to improve the abrasion resistance. However, use of more than 20% of this component renders the glass more devitrifiable.

$Li_2O$, $Na_2O$ and $K_2O$ may be added to make it easier to melt the glass mass. However, addition of more than 10% of $Li_2O$, $Na_2O$ more than 25% of $Na_2O$ and more than 25% of $K_2O$ with the total content of two or three of these ingredients being more than 30% is not permissible because the chemical durability of the glass is substantially reduced.

Addition of $Al_2O_3$ improves the chemical durability and also the abrasion resistance of the glass. However, addition of more than 20% of $Al_2O_3$ brings about an adverse effect. For example, the resistance against devitrification is reduced. Also, it is difficult to maintain the refractive index in the desired range.

$B_2O_3$ can be added in an amount up to 20%. The addition of more than 20% brings about the problem of insufficient chemical durability of the glass. To obtain the desired optical constants and light absorbing property, it is preferable that the percentage be small in the order of several percent.

$SiO_2$ improves the chemical durability as well as the resistance against abrasion. However, the use more than 7% of $SiO_2$ causes difficulty in melting the $SiO_2$ when the mixture of the glass materials is melted.

$TiO_2$ and $Nb_2O_5$ render the glass highly refractive and of low dispersive character. However, more than 10% of $TiO_2$ has an adverse effect. The desired property of the glass to sharply absorb infrared rays may be lost by the addition of more than 10% $TiO_2$ and more than 25% $Nb_2O_5$ renders the glass more devitrifiable.

The basic glass according to the invention is essentially composed of the above specified ingredients. However, if it is desired, there may be added other substance or substances such as $ZrO_2$, $La_2O_3$, $Gd_2O_3$, $Y_2O_3$, $Ta_2O_5$ or $As_2O_3$ in order to adjust the optical constants or to further improve the chemical durability, the refinability of the molten glass mass at the melting step, etc. These additives may be used alone or in combination in an amount up to 5% in total. If the content of one or more additives selected from the group consisting of $ZrO_2$, $La_2O_3$, $Gd_2O_3$ and $Y_2O_3$ is over 5% in total, there is obtained a glass which is less resistive against devitrification. $Ta_2O_5$ is a very expensive material so that the addition of more than 5% of it is considered unacceptable in view of cost. $As_2O_3$ is a known refining agent generally used at the melting step of the glass mass. A satisfactory refining effect can be obtained by the addition of less than 0.5% of $As_2O_3$.

To obtain the desired absorptivity of infrared rays, a certain amount of CuO is added to the above basic glass. CuO should be added in an amount not less than 0.01% to 100 parts by weight of the above basic glass composition. Less than 0.01% of CuO is insufficient for obtaining the desired effect even when the thickness of the glass is sufficiently increased. However, the amount of CuO should not be over 3%. If it is over 3%, the glass needs to be designed unnecessarily thin.

Actual examples of the CuO containing phosphate system optical glass according to the invention are shown in the following table, Table-1 as Example Nos. 1 to 19 together with their optical constants (nd and $\nu$d). Examples of similar glass according to the prior art are shown in Table-2 as Nos. S-1 to S-3 for the sake of comparison.

Spectral transmission curves of the examples 1 to 19 are shown in FIG. 3. In FIG. 3, curve 11 is for Example Nos. 1 to 5, curve 12 for Example No. 6, curve 13 for Example Nos. 7 to 12 and curve 14 for Example Nos. 13 to 19. The thickness of these samples is 5 m/m for Example Nos. 1 to 8, 1 m/m for Example No. 9, 2 m/m for Example Nos. 10 to 12 and 10 m/m for Example Nos. 13 to 19.

As seen from Table-1, the optical glasses according to the invention have higher refractive indices and higher dispersion than the prior art glasses shown in Table-2. Since, as previously described, the prior art comparative glass as shown in Table-2 has been developed for use as a filter, the tendency to devitrification of the glass is enhanced when the content of PbO or BaO is increased to achieve a higher diffractive index and higher dispersion power. In contrast, the optical glass according to the invention exhibits good stable resistance against devitrification. Further, FIG. 3 demonstrates that the embodiments of the optical glass according to the invention are all excellent in absorptivity for rays of light in the wavelength region ranging from 600 to 800 nm.

The CuO containing phosphate optical glass according to the invention can be manufactured in a simple manner employing the conventional glass manufacturing process. Raw material ingredients are weighed out and then mixed together. The mixture is melted in a platinum pot or the like with or without the use of an oxidizing atmosphere according to need. The melting can be carried out at a temperature in the range of about 950° to 1350° C. and the melting time may be one to five hours according to the composition of the mixture. After homogenizing the molten mass by stirring while deforming, the mixture is cast into a preheated die and annealed. In this manner, the optical glass according to the invention can be manufactured.

As previously mentioned, the CuO containing phosphate optical glass according to the invention is a glass of $P_2O_5$-$Sb_2O_3$-$(PbO+BaO+SrO+ZnO)$-CuO system which has various advantages over the known $P_2O_5$-BaO-CuO glass. The optical glass according to the invention is less devitrifiable and easy to melt and homogenize while manufacturing the glass. It has a wider range of optical constants regarding high refractive index and high to low dispersion. It exhibits high and sharp ability to absorb light in a selected wavelength region. With these desirable properties, the glass according to the invention is very easy to manufacture.

TABLE 1

(unit: wt. %)

| No. | 1 | 2 | 3 | 4 | 5 | 6 | 7 | 8 | 9 | 10 |
|---|---|---|---|---|---|---|---|---|---|---|
| $P_2O_5$ | 65.0 | 40.0 | 35.0 | 45.0 | 50.0 | 30.0 | 57.0 | 47.0 | 61.0 | 50.0 |
| $Sb_2O_3$ | 14.0 | 20.0 | 15.0 | 10.0 | 10.0 | 45.0 | 12.0 | 5.5 | 13.0 | 6.0 |
| PbO | 7.0 | | 25.0 | | 20.0 | | 7.0 | 5.0 | 7.0 | |
| BaO | 8.0 | 40.0 | | 4.0 | | | | 6.0 | | 7.0 |
| SrO | | | | 5.0 | | | | | | |
| ZnO | | | | | 6.0 | | 20.0 | | | 39.0 |
| MgO | 6.0 | | | | | | | 18.0 | | |
| CaO | | | 10.0 | | | | | | 7.0 | |
| $Li_2O$ | | | | 10.0 | | | | | | |
| $Na_2O$ | | | | | 5.0 | 5.0 | | | 22.0 | 5.0 |
| $K_2O$ | | | 10.0 | | 5.0 | | | | 5.0 | |
| $Al_2O_3$ | | | | | | | | | 5.0 | |
| $B_2O_3$ | | | | | | | | | | 3.5 |
| $SiO_2$ | | | | | 5.0 | | | | | |
| $TiO_2$ | | | | | | | | 7.0 | | |
| $Nb_2O_5$ | | | | 25.0 | 5.0 | | | | | 5.0 |
| CuO | 0.2 | 0.3 | 0.2 | 0.2 | 0.3 | 0.1 | 0.3 | 0.2 | 2.0 | 1.0 |
| nd | 1.586 | 1.682 | 1.661 | 1.688 | 1.618 | 1.729 | 1.591 | 1.578 | 1.585 | 1.629 |
| νd | 49.6 | 43.7 | 37.6 | 35.8 | 42.2 | 32.7 | 50.8 | 40.3 | 49.9 | 45.8 |

(unit: wt. %)

| No. | 11 | 12 | 13 | 14 | 15 | 16 | 17 | 18 | 19 |
|---|---|---|---|---|---|---|---|---|---|
| $P_2O_5$ | 54.0 | 47.0 | 30.0 | 40.0 | 59.0 | 40.0 | 40.0 | 55.0 | 30.0 |
| $Sb_2O_3$ | 12.0 | 11.0 | 10.0 | 10.0 | 13.0 | 2.0 | 1.0 | 11.0 | 20.0 |
| PbO | 6.0 | 6.0 | 60.0 | 30.0 | 6.0 | 15.0 | 30.0 | | 20.0 |
| BaO | 5.0 | 3.0 | | | 7.0 | | | 22.0 | |
| SrO | | 29.0 | | | | | | | |
| ZnO | | 4.0 | | 20.0 | | | | 9.0 | |
| MgO | 5.0 | | | | | | | 10.0 | |
| CaO | 18.0 | | | | 6.0 | | | | |
| $Li_2O$ | | | | | | | | | |
| $Na_2O$ | | | | | | 15.0 | 10.0 | | 5.0 |
| $K_2O$ | | | | | 5.0 | | | 5.0 | |
| $Al_2O_3$ | | | | | 15.0 | | 8.0 | | |
| $B_2O_3$ | | | | | | | 4.0 | 20.0 | |
| $SiO_2$ | | | | | | | | | |
| $TiO_2$ | | | | | | | | | |
| $Nb_2O_5$ | | | | | 9.0 | 8.0 | | | |
| CuO | 0.5 | 0.8 | 0.04 | 0.02 | 0.05 | 0.02 | 0.03 | 0.03 | 0.02 |
| nd | 1.634 | 1.632 | 1.809 | 1.693 | 1.624 | 1.581 | 1.632 | 1.585 | 1.662 |
| νd | 47.0 | 49.3 | 30.7 | 39.3 | 44.4 | 44.9 | 43.8 | 56.5 | 42.1 |

TABLE 2

| No. | S-1 | S-2 | S-3 |
|---|---|---|---|
| $P_2O_5$ | 57.0 | 64.0 | 57.5 |
| PbO | | | 8.0 |
| BaO | 42.0 | 25.0 | 27.5 |
| MgO | | 3.0 | |
| $Na_2O$ | | 5.0 | 4.5 |
| $Al_2O_3$ | 1.0 | 3.0 | 2.5 |
| CuO | 0.5 | 0.5 | 0.5 |
| nd | 1.569 | 1.538 | 1.571 |
| νd | 65.2 | 66.7 | 60.4 |

Embodiments of the optical glass suitable for use together with an Se photosensitive member will be described hereinafter.

The lens suitable for use with the combination of an Se photosensitive member and a halogen lamp is required to have a spectral transmission factor as shown in FIG. 4. By use of such lens there can be obtained an overall spectral sensitivity approximate to the relative visibility as seen from FIG. 4. Glass suitable for forming such lens should have properties meeting the following requirements:

Its refractive index should be relatively high and its dispersion should be relatively low;

Its absorption edge should appear near 400 nm and its light absorptivity should sharply drop in the wavelength region ranging from 400 to 500 nm;

It should exhibit good transmittivity to light in the wavelength region ranging from 500 to 700 nm; and It should have good resistance against devitrification.

According to the invention, the above requirements can be satisfied by an optical glass containing stable $Ce^{4+}$ ions formed in a molten glass mass under an oxidizing atmosphere.

The optical glass according to the invention containing 0.1 to 1.0 wt.% of $CeO_2$ added to 100 parts by weight of a glass composition comprising:

$B_2O_3$ 25–40% (by weight)
$SiO_2$ 0–12%
$ZrO_2$ 0–10%
$La_2O_3$ 25–50%
$Gd_2O_3$ 0–5%
$CaO$ 0–12%
$BaO$ 0–10%
$ZnO$ 0–7%
$Ta_2O_5$ 0–5%
$WO_3$ 0–3% wherein the $CeO_2$ containing glass has the optical constants of refractive index (nd) ranging from 1.65 to 1.85 and Abbe number ($\nu d$) ranging from 57 to 45.

Some actual examples of the above optical glass according to the invention are shown in the following table, Table-3 as Example No. 1 and No. 2 together with their optical constants (nd and $\nu d$). The spectral transmission factor characteristic curves thereof are also shown in FIG. 5. The thickness of the glass sample used was 10 mm for every example.

TABLE 3

| No. | 1 | 2 (unit: wt. %) |
|---|---|---|
| $B_2O_3$ | 38 | 30 |
| $SiO_2$ | 10 | 1 |
| $ZrO_2$ | 4 | 8 |
| $La_2O_3$ | 30 | 45 |
| $Gd_2O_3$ |  | 3 |
| $CaO$ | 10 |  |
| $BaO$ | 3 | 8 |
| $ZnO$ | 5 |  |
| $Ta_2O_5$ |  | 4 |
| $WO_3$ | — | 1 |
| $CeO_2$ | 0.3 | 0.5 |
| nd | 1.683 | 1.783 |
| $\nu d$ | 55.1 | 47.9 |

While the present invention has been particularly shown and described with reference to embodiments adapted to compensate for the spectral sensitivity of CdS- and Se-photosensitive members, it is to be understood that the present invention may be applied also to an organic semiconductor (opc) photosensitive member in order to compensate for the spectral sensitivity thereof. As well-known to those skilled in the art, the spectral sensitivity of an opc photosensitive member varies in a broad range according to the kind of opc. In light of the above teachings, the spectral sensitivity of such photosensitive member also can be compensated for by using a suitable lens made of such optical glass whose spectral transmission factor sharply drops in the long wavelength region or in the short wavelength region or in both of the two regions.

Now, embodiments of the lens system employing the above shown wavelength selective optical glasses according to the invention will be described with reference to FIGS. 6 to 9.

In the following embodiments, the lens system according to the invention is formed as an image-forming lens which is disposed in the optical path extending from the original to the photosensitive member. However, it is to be understood that the lens system may be disposed at any desired position in the optical path from the illuminant to the photosensitive member and the lens system may be used for any CdS-, Se-, or opc-photosensitive member or other type of photosensitive members. In FIGS. 6 to 9, the single lens made of the above shown wavelength selective optical glass is indicated by hatching.

Figure 6:
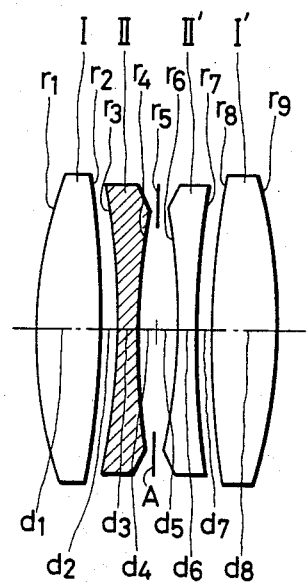
FIGS. 6, 7, 8 and 9 show some embodiments of the lens system used in the invention.

FIG. 6 shows a first embodiment of the image-forming lens according to the invention.

The image-forming lens shown in FIG. 6 is a transmission type lens comprising two biconvex lenses I and I' and two biconcave negative lenses II and II' arranged symmetrically relative to an aperture stop A. The positive lenses I and I' are made of such optical glass which is low in dispersion. On the contrary, the negative lenses II and II' are made of such optical glass which is high in dispersion. By this combination, the chromatic aberration is suppressed and other various aberrations are well corrected in the image-forming lens. In this embodiment, by way of example, the two positive lenses I and I' have been made of ordinary crown optical glass and the negative lens II' has been made of flint optical glass. The negative lens II has been made of the wavelength selective optical glass according to the invention. Lens data for this embodiment are given below wherein the unit of curvature radius r and distance d are in mm.

| lens | curvature radius r | distance d | dispersion $\nu d$ | refractive index nd |
|---|---|---|---|---|
| I | $r_1 = 33.35$ | $d_1 = 5.7$ | 53.2 | 1.69 |
|  | $r_2 = -94.95$ | $d_2 = 1.9$ |  | 1 |
| II | $r_3 = -48.47$ | $d_3 = 1.5$ | 40.7 | 1.58 |
|  | $r_4 = 44.65$ | $d_4 = 3.4$ |  | 1 |
|  | $r_5 = \infty$ (aperture A) | $d_5 = 3.4$ |  | 1 |
| II' | $r_6 = -44.65$ | $d_6 = 1.5$ | 40.7 | 1.58 |
|  | $r_7 = 48.47$ | $d_7 = 1.9$ |  | 1 |
| I' | $r_8 = 94.95$ | $d_8 = 5.7$ | 53.2 | 1.69 |
|  | $r_9 = -33.35$ |  |  |  |

Figure 7:
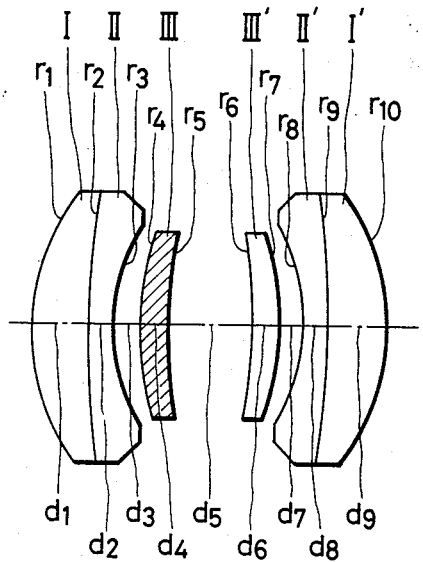

FIG. 7 shows a second embodiment of the image-forming lens according to the invention.

In this second embodiment, the wavelength selective optical glass has been used for the single lens III of the image-forming lens.

For a wavelength selective lens it is desirable that the on-axis optical path length and the off-axis optical path length of the effective beam of light passed through the lens be equal to each other. The reason for this is that the loss of optical path by absorption must be balanced. The meniscus lens shown in the embodiment meets the desire. Of course, the desire can be satisfied by a lens other than the shown meniscus lens provided that the lens is small in curvature difference.

In the case where the balancing of optical path length can not be attained by use of only one single-lens, there may be used two or more single lenses made of wavelength selective glass so as to attain the balance by the overall optical path length passed over by the light.

Lens data for the second embodiment are given below:

| lens | curvature radius r | distance d | dispersion $\nu d$ | refractive index nd |
|---|---|---|---|---|
| I | $r_1 = 25.11$ | $d_1 = 7.40$ | 50.9 | 1.65 |
| II | $r_2 = -395.69$ | $d_2 = 1.69$ | 38.0 | 1.60 |
|  | $r_3 = 19.19$ | $d_3 = 1.62$ |  | 1.0 |
| III | $r_4 = 31.64$ | $d_4 = 3.70$ | 38.0 | 1.72 |
|  | $r_5 = 46.57$ | $d_5 = 9.34$ |  | 1.0 |
| III' | $r_6 = -46.57$ | $d_6 = 3.70$ | 38.0 | 1.72 |
|  | $r_7 = -31.64$ | $d_7 = 1.62$ |  | 1.0 |
|  | $r_8 = -19.19$ | $d_8 = 1.69$ | 38.0 | 1.60 |
| II' | $r_9 = 395.69$ | $d_9 = 7.40$ | 50.9 | 1.65 |
| I' | $r_{10} = -25.11$ |  |  |  |

Figure 8:
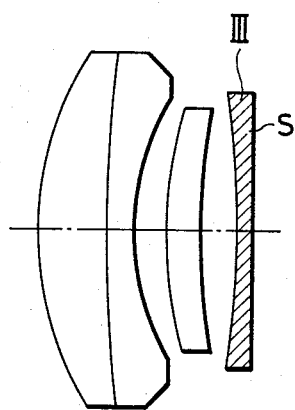

FIG. 8 shows a third embodiment of the image-forming lens according to the invention.

In this embodiment, the wavelength selective optical glass has been used for a reflection type lens. The second surface S of the mirror lens III is formed as a mirror surface so that the effective beam passes through the mirror lens twice. Therefore, where a CdS photosensitive member is used, the rays of light in the near infrared region are decayed by the lens. All other rays in the necessary wavelength regions other than the infrared region are not decayed and remain effective to form an image.

Figure 9:
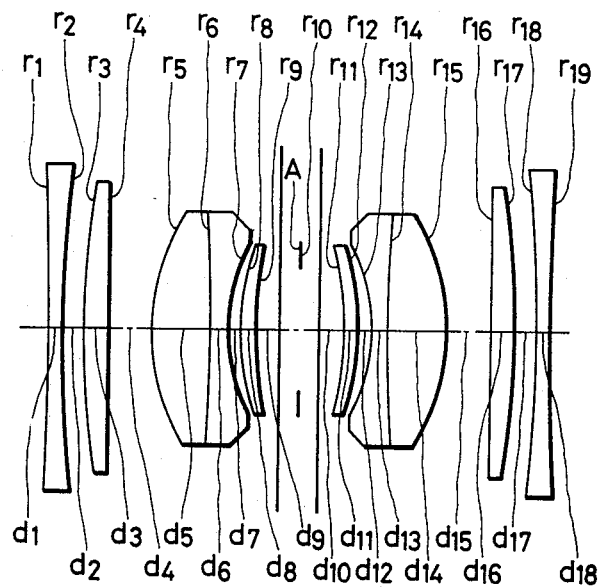

FIG. 9 shows a fourth embodiment of the image-forming lens according to the invention.

In this embodiment, the present invention is applied to a zoom lens which is able to change magnification without need of changing the object-to-image distance. The wavelength selective optical glass has been used for the single lens L5 of the zoom lens. In changing the magnification, the zoom lens is totally or internally moved to set the necessary position and focal length for forming an image. It is unnecessary to correct the optical path length by means of mirrors. The single lens L5 belongs to a moving lens group of the zoom lens and is internally moved for magnification change.

The lens of this embodiment is composed of ten single lenses $L_1$ to $L_{10}$ which are arranged symmetrically relative to an aperture stop A. Lens data for the fourth embodiment are given below:

| lens | curvature radius r | distance d | dispersion $\nu d$ | refractive index nd |
|---|---|---|---|---|
| L1 | $r_1 = -1130.16$ | $d_1 = 4.10$ | 42.8 | 1.57 |
|  | $r_2 = 445.11$ | $d_2 =$ variable |  | 1 |
| L2 | $r_3 = 272.83$ | $d_3 = 6.57$ | 44.7 | 1.68 |
|  | $r_4 = 2688.99$ | $d_4 = 12.31$ |  | 1 |
| L3 | $r_5 = 60.94$ | $d_5 = 15.54$ | 48.3 | 1.67 |
| L4 | $r_6 = -594.38$ | $d_6 = 5.34$ | 37.0 | 1.61 |
|  | $r_7 = 46.05$ | $d_7 = 3.86$ |  | 1 |
| L5 | $r_8 = 70.96$ | $d_8 = 3.83$ | 38.0 | 1.72 |
|  | $r_9 = 98.16$ | $d_9 =$ variable |  | 1 |
| (aperture A) | $r_{10} = \infty$ | $d_{10} =$ variable |  | 1 |
| L6 | $r_{11} = -98.16$ | $d_{11} = 3.83$ | 38.0 | 1.72 |
|  | $r_{12} = -70.96$ | $d_{12} = 3.86$ |  | 1 |
| L7 | $r_{13} = -46.05$ | $d_{13} = 5.34$ | 37.0 | 1.61 |
| L8 | $r_{14} = 594.38$ | $d_{14} = 15.54$ | 48.3 | 1.67 |
|  | $r_{15} = -60.94$ | $d_{15} = 12.31$ |  | 1 |
| L9 | $r_{16} = -2688.99$ | $d_{16} = 6.57$ | 44.7 | 1.68 |
|  | $r_{17} = -272.83$ | $d_{17} =$ variable |  | 1 |
| L10 | $r_{18} = -445.11$ | $d_{18} = 4.10$ | 42.8 | 1.57 |
|  | $r_{19} = 1130.16$ |  |  | 1 |

| focal length of the total system f | projection magnification | $d_2, d_{17}$ | $d_9, d_{10}$ |
|---|---|---|---|
| 230.0 | 1.0x | 6.10 | 12.31 |
| 228.43 | 0.86x (1.16x) | 6.97 | 11.46 |
| 221.39 | 0.7x (1.43x) | 10.92 | 7.51 |

As readily understood from the foregoing, the present invention permits compensation for the color sensitivity in a copying machine in an inexpensive and stable manner. While the present invention has been particularly shown and described in connection with a copying machine, it is to be understood that the application of the present invention is not limited to copying machines. As previously noted, the present invention has a wide application range including, for example, use in facsimiles and television cameras.

What we claim is:

1. Apparatus for projecting an image of an object on a CdS system photosensitive member, said apparatus comprising:
    means for illuminating said object; and
    image-forming means disposed in the optical path between said illumination means and said photosensitive member,
    said image-forming means including at least one lens whose spectral transmission factor is high in the wavelength region ranging from 400 nm to 600 nm but sharply drops in the wavelength region ranging from 600 nm to 800 nm.

2. A projection apparatus according to claim 1, wherein said lens is formed of $P_2O_5$-(PbO+BaO+SrO+ZnO)-CuO system glass containing $Sb_2O_3$ as an ingredient.

3. A projection apparatus according to claim 1, wherein said illumination means is a halogen illuminant.

4. Apparatus for projecting an image of an object on an Se system photosensitive member, said apparatus comprising:
    means for illuminating said object; and
    image-forming means disposed in the optical path between said illumination means and said photosensitive member,
    said image-forming means including at least one lens having a spectral transmission factor characteristic for ensuring that a light beam of predetermined spectral wavelength characteristic is incident on the Se member, said predetermined spectral wavelength characteristic being such that the combination thereof with the spectral sensitivity characteristic of said Se member results in an overall spectral sensitivity approximate to the relative luminous efficiency.

5. A projection apparatus according to claim 4, wherein said lens has a spectral transmission factor characteristic curve which is high in the wavelength region ranging from 500 nm to 700 nm and sharply drops in the wavelength region ranging from 400 nm to 500 nm.

6. A projection apparatus according to claim 4, wherein said illumination means is a halogen illuminant.

7. Apparatus for projecting an image of an object on an organic semiconductor photosensitive member, said apparatus comprising:
means for illuminating said object; and
image-forming means disposed in the optical path between said illumination means and said photosensitive member,
said image-forming means including at least one lens having a spectral transmission factor characteristic for ensuring that a light beam of a predetermined spectral wavelength characteristic is incident on the organic semiconductor member, said predetermined spectral wavelength characteristic being such that the combination thereof with the spectral sensitivity characteristic of said organic semiconductor member results in an overall spectral sensitivity approximate to the relative luminous efficiency.

8. A projection apparatus according to claim 7, wherein said lens has a spectral transmission characteristic curve which sharply drops in at least one short wavelength region or long wavelength region.

9. A projection apparatus according to any one of claims 1, 4 and 7, wherein said lens is a lens having a small curvature difference.

10. A projection apparatus according to claim 9, wherein said lens is in the form of a meniscus.

11. A projection apparatus according to claim 1 or 7, wherein said lens is formed of a phosphate optical glass containing 0.01–3.0 wt.% of CuO added to 100 parts by weight of a basic glass composition comprising:

$P_2O_5$ 28–68 (wt.%)
$Sb_2O_3$ 1–45
PbO 0–65
BaO 0–45
SrO 0–30
ZnO 0–40, wherein PbO+BaO+SrO+ZnO is 5–65 wt.%;
MgO 0–20
CaO 0–20
$Li_2O$ 0–10
$Na_2O$ 0–25
$K_2O$ 0–25, wherein $Li_2O+Na_2O+K_2O$ is 0–30 wt.%;
$Al_2O_3$ 0–17
$B_2O_3$ 0–20
$SiO_2$ 0–7
$TiO_2$ 0–10
$Nb_2O_5$ 0–25.

12. A projection apparatus according to claim 4 or 7, wherein said lens is formed of an optical glass containing 0.1–1.0 wt.% of $CeO_2$ added to 100 parts by weight of a glass composition comprising:

$B_2O_3$ 25–40% (by weight)
$SiO_2$ 0–12%
$ZrO_2$ 0–10%
$La_2O_3$ 25–50%
$Gd_2O_3$ 0–5%
CaO 0–12%
BaO 0–10%
ZnO 0–7%
$Ta_2O_5$ 0–5%
$WO_3$ 0–3%.

* * * * *

UNITED STATES PATENT AND TRADEMARK OFFICE
CERTIFICATE OF CORRECTION

PATENT NO. : 4,505,569

DATED : March 19, 1985

INVENTOR(S) : SUSUMU SETO, ET AL.

It is certified that error appears in the above-identified patent and that said Letters Patent is hereby corrected as shown below:

Column 5, line 40, "effect to which renders the glass more devitrifiable" should read --effect which renders the glass more devitrifiable--;

Column 6, line 12, "However, the use more than" should read --However, the use of more than--.

Table 1, in the line for "$Al_2O_3$", "5.0" should appear in --Column 8-- rather than in "Column 9";

Table 1, in the line for "$B_2O_3$", "3.5" should appear in --Column 8-- rather than in "Column 9";

Table 1, in the line for "$K_2O$", "5.0" should appear in --Column 16-- rather than in "Column 15" and "5.0" should appear in --Column 19-- rather than in "Column 18";

Table 1, in the line for "$Al_2O_3$", "4.0" should appear in --Column 18 -- rather than in "Column 17--. and "8.0" should appear in --Column 18-- rather than in "Column 17".

UNITED STATES PATENT AND TRADEMARK OFFICE
CERTIFICATE OF CORRECTION

PATENT NO. : 4,505,569

DATED : March 19, 1985

INVENTOR(S) : SUSUMU SETO, ET AL.

It is certified that error appears in the above-identified patent and that said Letters Patent is hereby corrected as shown below:

Column 8, Table 1, in the line for "$B_2O_3$" "4.0" should appear in --Column 18-- rather than "Column 17" and "20.0" should appear in --Column 19-- rather than "Column 18".

Column 10, line 9, after "and" insert --that--;
line 62, "the" (second occurrence) should read --this--;
line 63, "the" should read --this--.

Signed and Sealed this

Fourth Day of March 1986

[SEAL]

Attest:

DONALD J. QUIGG

Attesting Officer

Commissioner of Patents and Trademarks